Oct. 5, 1948.   S. RIA   2,450,561
HEATING PLANT
Filed Oct. 1, 1946   3 Sheets-Sheet 1

INVENTOR
SEYMON RIA
BY
Cook & Robinson
ATTORNEY

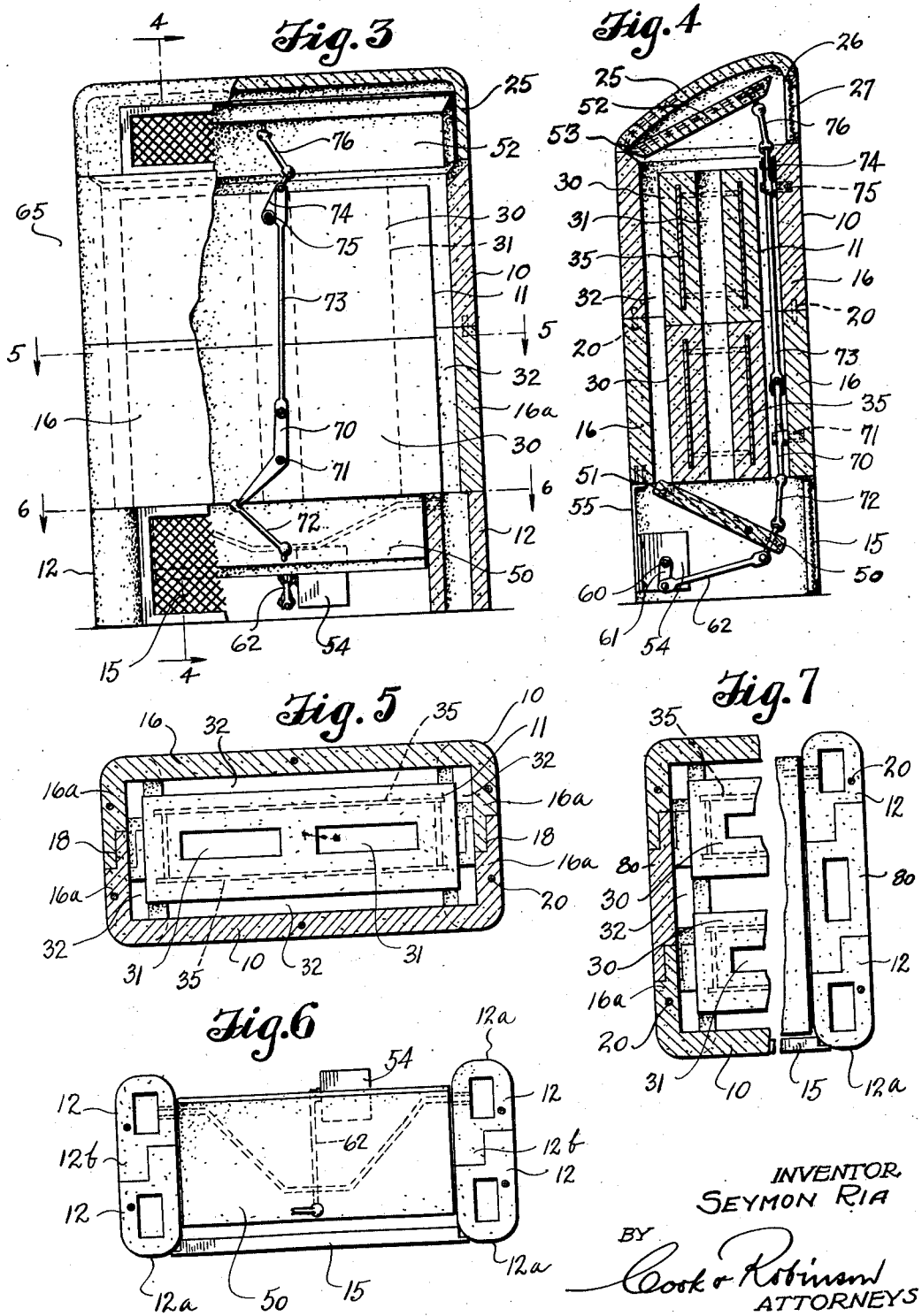

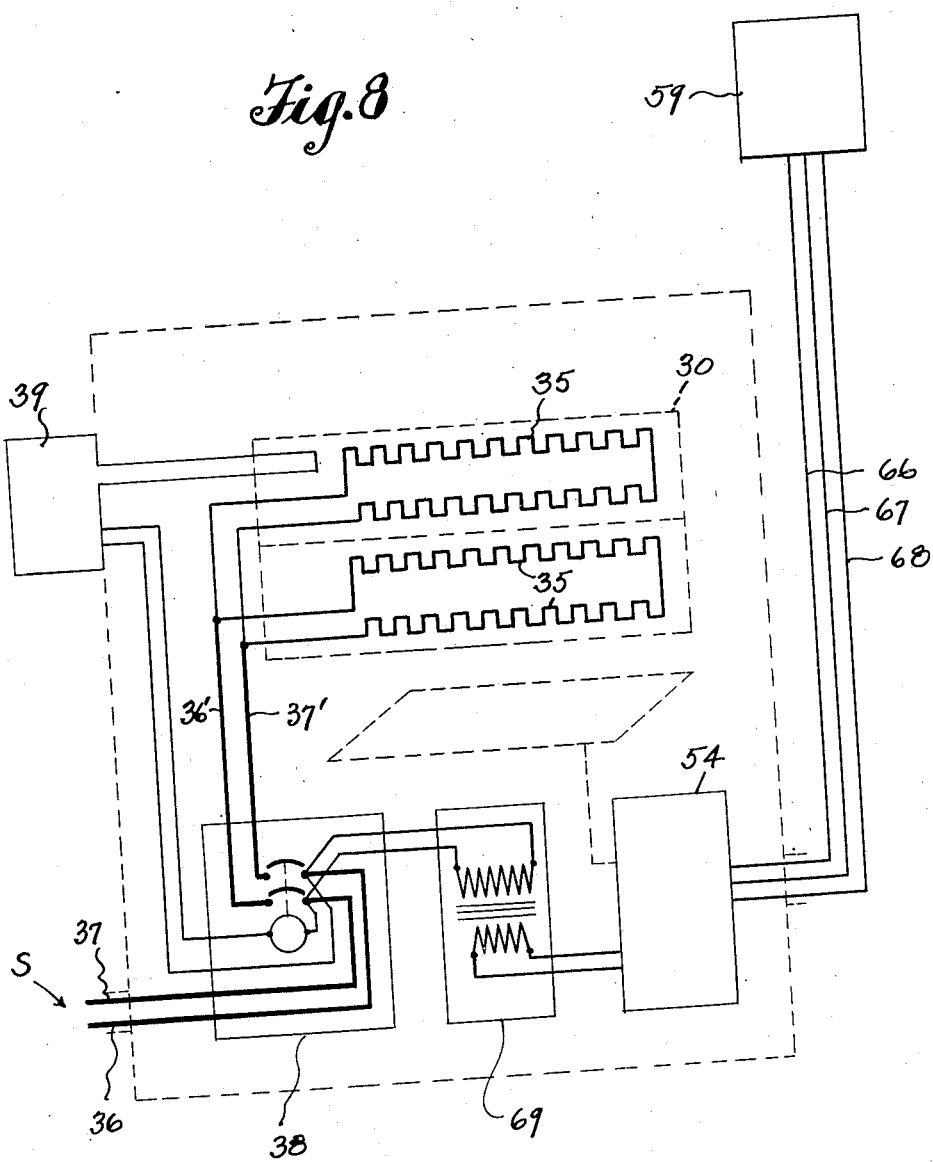

Patented Oct. 5, 1948

2,450,561

UNITED STATES PATENT OFFICE 2,450,561

HEATING PLANT

Seymon Ria, Seattle, Wash.

Application October 1, 1946, Serial No. 700,439

4 Claims. (Cl. 219—38)

This invention relates to improvements in space heaters, and it has reference more particularly to electric heaters designed for room or residential heating purposes and which are of that type comprising a heat storage body with means for supplying heat thereto and means for controlling the dissipation of the stored heat from the body.

It is the principal object of this invention to provide an improved heater of the above stated character wherein the heat storage body is contained within an insulated case, or housing, of novel composition having an air inlet and an outlet through which air from the area to be heated may be caused to circulate in contact with the heat storage body for heating thereby, and which openings are equipped with closure means whereby the circulation may be controlled and whereby the housing may be closed tightly against escape of the heat when such is desired to conserve heat.

It is also an object of this invention to provide heat storage bodies for such heaters with heating elements embedded therein so that all heat from the elements will be received by the storage bodies and wherein contact surfaces of substantial area are provided for the dissipation of stored heat to the air that is circulated throuogh the housing.

It is also an object of the invention to provide a heater of the character above described that is equipped for the automatic control of the doors or closures for the housing passages so that the circulation of air through the housing may be thermostatically controlled in a manner to maintain a specified temperature within the heated room or area. Also, wherein means separate from the above thermostatic means is provided for controlling the heating of the heat storage body.

Yet another object of the invention is to provide a heater that may be built up in a various number of units to meet normal or special heating requirements.

Still another object resides in the provision of an enclosure or housing for heaters of this character from slabs and blocks that are composed principally of that material known as "Scoria" to insure maximum insulating effect and economical production.

Still further objects of the invention reside in the details of construction of parts, in their relationship and combination in use, and in the mode of operation of the heater as will hereinafter be fully described.

In accomplishing these and other objects of the invention, I have provided the improved details of construction, the preferred forms of which are illustrated in the accompanying drawings, wherein—

Fig. 3 is a partial front elevation and partial vertical section of the device.

Fig. 4 is a vertical section on line 4—4 in Fig. 3.

Fig. 5 is a horizontal section, taken on line 5—5 in Fig. 3.

Fig. 6 is a horizontal section taken on line 6—6 in Fig. 3.

Fig. 7 is a horizontal sectional detail, illustrating the enlarging of the housing for use of additional heat storage elements.

Fig. 8 is a wiring diagram for the electrical equipment of the device.

It will here be explained that heaters of this kind may be made in various sizes to embody one or more of the present heat storage bodies. Furthermore, they may be made to operate on natural circulation of air, or equipped with fans, or blowers, to obtain a forced circulation, as may be found necessary or desirable.

In the present drawings, I have shown a simple form of room heater which embodies the principles of the present invention therein, and later I will explain how this unit might be enlarged or expanded to satisfy greater heating requirements.

Referring more in detail to the drawings—

In the present illustration, 10 designates, in its entirety, the insulating housing or casing of the heater and 11 designates a two-unit heat storage body that is contained within the housing. The housing 10 is built up of blocks and slabs that are pre-cast, or molded from a heat insulating material, and for this purpose I prefer to use fragmentary lava, known as "Scoria" which, mixed with a cement type binder, provides a quick-setting, light and durable material which has very high insulating value.

Figure 1:
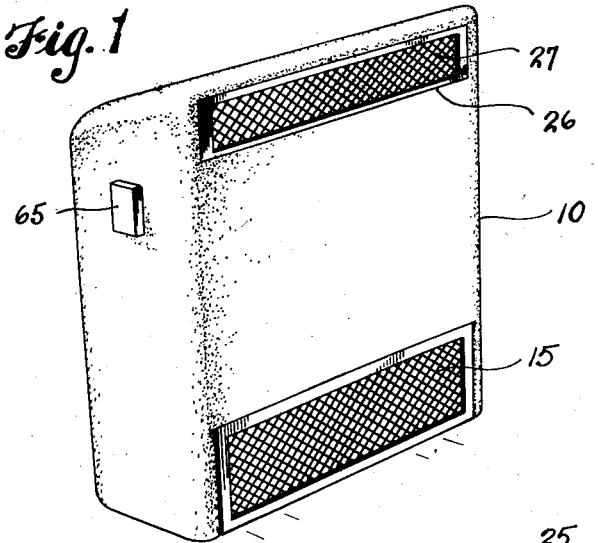
Fig. 1 is a perspective view of a heater embodied by the present invention.

In the building up of the housing 10 in a small heater of the kind shown in Fig. 1, I prefer to use four base blocks, herein designated by reference numeral 12. These blocks are alike in size and form, and are assembled in pairs. It is shown in Fig. 6 that each block has a rounded outer end or nose portion, as at 12a and, at its inner end, has a vertical tongue 12b at one side. In the assembly of the blocks in pairs, the blocks are aligned and their tongue portions are overlapped one with the other and the pairs of blocks are placed in parallel, spaced relationship as shown in Fig. 6. At the front side of the housing, it is desirable that a grill such as that designated by numeral 15 be applied between the blocks, but at the rear side of the housing the space may be left open, except when forced circulation of air is to be employed.

Figure 2:
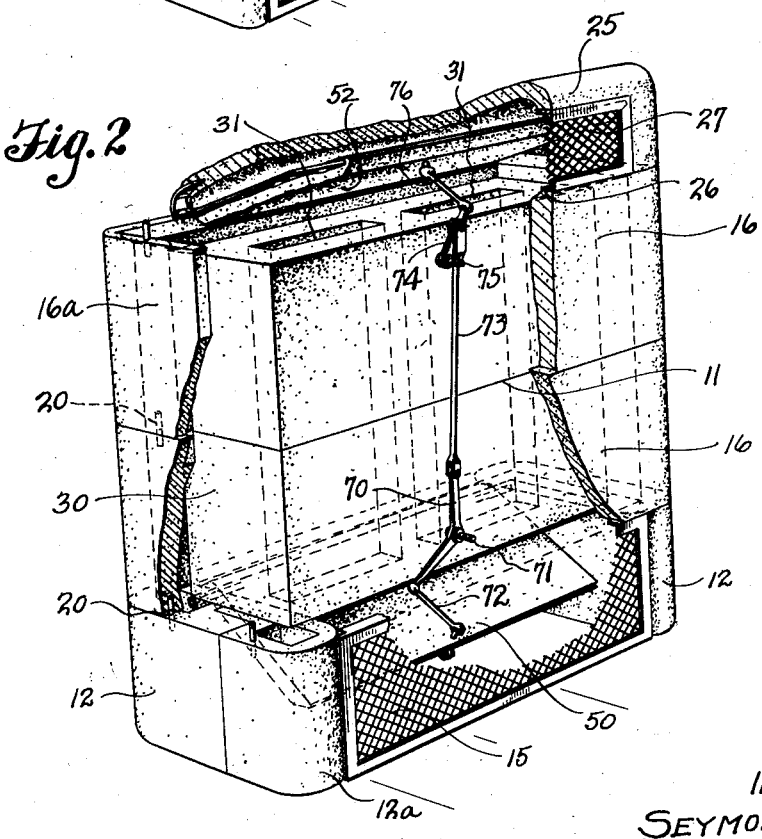
Fig. 2 is a perspective view of the same with parts of the housing or insulating casing broken away for better illustration of enclosed parts; this view showing the linkage whereby the closures for the air passages are operatively connected.

Erected upon the spaced pairs of base blocks is the main body of the housing. This also is built up of precast sections or slabs of Scoria, and the binder, comprising a face or side portion 16 that has a length corresponding to the distance from outside to outside of the paired sets of base blocks, and opposite end portions 16a—16a that are cast integral with and in planes at right angles to the face portion. Two of such sections are assembled together to form a rectangular enclosure, as in Fig. 5, and this assembly of pieces is placed directly upon the paired sets of base blocks to form the lower end portion of the housing or casing. It is shown in Fig. 5 that the end portions of these sections are tongued and grooved, as at 18, to overlap and interlock to insure a good holding connection and no open joints. Similarly assembled sections may be erected upon this lower set to build up the housing 10 to a desired height. In the present structure, as seen in Figs. 2 and 3, I have used two tiers of the side portions 16. It is preferred in the assembly of superimposed tiers, to tie them together by use of dowels, as shown at 20 in the various views, to maintain alignment and insure rigidity of construction.

The upper end of the housing 10 is closed by a cast cap block 25. This is of Scoria and is formed of such dimensions as to rest upon the housing flush with its side and end walls. As shown best in Fig. 4, the cap has a forwardly and upwardly sloping top wall and is formed in the front with a rectangular opening 26 preferably fitted with a grill designated by numeral 27; this opening 26 being the outlet for heated air while the previously mentioned opening that is formed between the spaced sets of base blocks, is the inlet for air to be heated.

Located within the stack-like housing, as formed by the various blocks, is the heat storage body 11. This body, as herein shown, comprises two rectangular blocks 30 of like size and disposed one upon the other, as best shown in Figs. 2 and 4. Each block is formed with two vertical passages 31 therein and these passages of the two blocks are in registration in the assembly to provide two vertical stacks or passages therethrough that open at their lower ends into the open space between the paired base blocks and, at their upper ends open into the space within the cap block 25. The horizontal dimensions of the blocks 30 are such that when centrally located on the casing, as in Fig. 5, open passages will be provided between the housing walls and heat storage blocks at both sides and ends, such spaces being designated at 32. These passages, together with the vertical passages 31, provide for the upflow of air through the housing for heating by contacting the surfaces of the heated body 11.

The assembly of heat storage blocks 30 is supported upon the two pairs of base blocks, as will be understood by reference to Figs. 2 and 5, and spans the space between them.

Each of the heat storage blocks 30 is cast of soapstone or other suitable material mixed with a suitable cement-like binder, and embedded in each of the blocks, at sides and ends as shown in Figs. 4 and 5, are electrical heating elements 35. These elements preferably are made up of a suitable wire or strip of resistance material wound on an insulating plate or carrier.

The heating elements 35 of these blocks 30 are supplied with current from a source of supply designated in Fig. 8 at S, through circuit wires 36 and 37 leading to wires 36' and 37' through a control relay 38. Under control of an airstat 39; the latter being directly influenced by the heat of the storage body.

Contained within the space between the paired sets of base blocks, is a door 50. This door is hingedly attached at its rear edge, as at 51 in Fig. 4, and may be swung upwardly and closed against the lower end surface of the heat storage units, thus to close all the vertical air passages 31 and 32 through and about the units, and may be swung downwardly to an open position for a direct inflow of air from the inlet and then through the unit passages 31 and 32. Likewise, at the upper end of the unit, is a door 52, similarly hinged within the upper end of the housing, as at 53, to swing into and from a position closed against the upper end of the housing. The two doors, which are designed to close the opposite ends of the passage through the stack-like casing, are inter-connected by linkage presently described to cause them to open and close in unison. The lower door controls the action of the upper door and it is operated between its open and closed positions by connection with an auto-cyn control mechanism known in trade as a "modu-trol" and embodied in the control box 54, that is located in the back portion of the open space between the base blocks as seen in Fig. 4, and is affixed to a plate 55 depending from the rear wall of the casing. This auto-cyn control mechanism includes a horizontal shaft 60, extended from the box and adapted to be rotated in opposite directions in accordance with rise and fall of room temperature. A crank arm 61 is fixed to the shaft, and a link 62 that joins the arm and door 50 in such manner that the door will be caused to move between open and closed positions with the rotative movements of the shaft and to be completely closed at a designated room temperature and opened at a lower temperature when heat is required.

The auto-cyn is electrically connected with the circuit wires 36 and 37 through a transformer 69.

The linkage whereby the two doors are connected to operate in unison is shown best in Figs. 2, 3 and 4, wherein it is shown that a bell crank lever 70 is pivotally mounted on the inside of the front wall of the casing just above the air inlet by a pivot stud 71. One arm of the bell crank is pivotally connected to a link 72 which in turn is pivotally connected with the door 50 so that opening and closing the door will rock the bell crank accordingly. The other arm of the bell crank is connected pivotally to a link 73 which in turn is pivotally connected to a lever arm 74 that is pivotally mounted at one end in a stud 75 fixed in the housing wall just below the upper door. The other end of the arm 74 has a link 76 connecting it pivotally with the upper door. The linkage, as shown and described, provides that, with the opening and closing of the lower door, the upper door will be moved in synchronism therewith between its closed and open positions. When both doors are tightly closed, no heat can escape from the storage body, but as the doors are opened, to more or less extent, circulation of air upwardly through the body 11 is permitted accordingly and heating of the air will take place by dissipation of heat from the air contacted surfaces to the air stream.

When such devices are to be used for heating large areas, then they may be made in multiple units of two or more stacks placed side to side as has been illustrated in Fig. 7 and the height of the stacks may be increased as desired or required. To expand the casing to accommodate the two or more stacks of blocks 30, I add the insert slabs or blocks, designated by referenec numeral 80 in Fig. 7, between the blocks 12. Also, it is anticipated that forced circulation might be used in connection with heaters of this kind and this would be accomplished by forced delivery of air by any well known means, into the inlet passage.

For house heating use, forced circulation is most practical and the heated air might be piped from the outlet to various points of distribution as is now done in the usual types of residence heating systems using hot air.

It is anticipated that in the building of such heating devices, the outside surface of the assembled blocks will be covered with a thin layer of a suitable cement or plastic to add insulating effect thereto and to close all joints and cracks, thus to add to the appearance of the device as well as to increase its effectiveness.

Having thus described my invention, what I claim as new therein and desire to secure by Letters Patent is:

1. A heating plant of the character described comprising a heat insulated housing forming a stack-like enclosure having an air inlet at its lower end and an outlet at its upper end and through which an air stream may be caused to flow, a body of heat-absorbing material supported in said housing and extending from its lower end substantially to the height thereof, and so related to the housing walls as to provide vertical air passageways between the body surfaces and the housing walls for direct upflow of air from the inlet to said outlet, means for electrically heating said body of material, doors arranged within the housing to tightly close said passageways at upper and lower ends of said body of heat-absorbing material and thermostatically controlled means for actuating the doors between open and closed positions.

2. A heating plant of the character described comprising a heat insulated housing forming a stack-like enclosure having an air inlet at its lower end and an outlet at its upper end and through which an air stream may be caused to flow, a body of heat-absorbing material supported in said housing and extending from its lower end substantially to the height thereof, and so related to the housing walls as to provide vertical air passageways between the body surfaces and the housing walls for direct upflow of air from the inlet to said outlet, means for electrically heating said body of material, doors arranged within the housing to tightly close said passageways at upper and lower ends of said body of heat-absorbing material; said doors being hingedly mounted and there being linkage connecting them whereby they are caused to open and close in synchronism, and a thermostatically controlled means operatively connected with one door for moving it between open and closed positions.

3. In a heating plant of the character described, a stack-like, insulated housing formed at its lower and upper ends with openings for inflow and outflow of air therethrough, a body of heat-absorbing material disposed within said housing and providing air passageways about it and having vertical passages therethrough, electrical heating elements embedded in said body, a source of electricity, circuit connections for supplying current from said source to said elements, doors composed of heat insulating material hingedly mounted in the housing and adapted to be moved to closed positions to enclose the said body between them againts heat dissipation, and to be adjustably opened to control flow of air through the housing passages in contact with said body, an auto-cyn for actuating said doors between open and closed positions, and thermostatic means controlling the auto-cyn.

4. A heating plant as in claim 3, including also a thermostatic means independent of that for controlling the auto-cyn, for controlling the flow of current to the said heating elements.

SEYMON RIA.

REFERENCES CITED

The following references are of record in the file of this patent:

UNITED STATES PATENTS

| Number | Name | Date |
| --- | --- | --- |
| 1,142,771 | Hadaway, Jr. | June 8, 1915 |
| 2,003,496 | Roe | June 4, 1935 |

OTHER REFERENCES

Dana et al., Eng'g. Bulletin No. 46, State College of Washington, July, 1935.